US011965987B2

(12) United States Patent
Ishii et al.

(10) Patent No.: US 11,965,987 B2
(45) Date of Patent: Apr. 23, 2024

(54) SOLID-STATE IMAGING DEVICE, DISTANCE MEASURING DEVICE, AND DISTANCE MEASURING METHOD

(71) Applicant: Panasonic Intellectual Property Management Co., Ltd., Osaka (JP)

(72) Inventors: Motonori Ishii, Osaka (JP); Shigetaka Kasuga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 411 days.

(21) Appl. No.: 17/486,753

(22) Filed: Sep. 27, 2021

(65) Prior Publication Data

US 2022/0057490 A1 Feb. 24, 2022

Related U.S. Application Data

(63) Continuation of application No. PCT/JP2019/013413, filed on Mar. 27, 2019.

(51) Int. Cl.
*G01S 7/4861* (2020.01)
*G01S 17/10* (2020.01)
*H04N 23/56* (2023.01)
*H04N 25/75* (2023.01)

(52) U.S. Cl.
CPC .......... *G01S 7/4861* (2013.01); *G01S 17/10* (2013.01); *H04N 23/56* (2023.01); *H04N 25/75* (2023.01)

(58) Field of Classification Search
CPC ...... G01S 7/4861; G01S 17/10; G01S 7/4863; G01S 17/894; H04N 23/56; H04N 25/75; H04N 25/745
See application file for complete search history.

(56) References Cited

U.S. PATENT DOCUMENTS

| 11,769,775 | B2* | 9/2023 | Otani | H04N 25/40 356/5.01 |
| 2006/0192938 | A1* | 8/2006 | Kawahito | G01S 7/4863 356/5.03 |
| 2008/0056697 | A1* | 3/2008 | Perala | G03B 17/00 396/56 |
| 2012/0248290 | A1 | 10/2012 | Kamiyama et al. | |
| 2016/0182790 | A1* | 6/2016 | Horesh | H04N 25/531 348/371 |
| 2016/0259057 | A1* | 9/2016 | Ito | G03B 13/20 |
| 2020/0278194 | A1* | 9/2020 | Kawahito | G01S 7/484 |

FOREIGN PATENT DOCUMENTS

JP 2012-217060 A 11/2012

OTHER PUBLICATIONS

International Search Report issued in corresponding International Patent Application No. PCT/JP2019/013413, dated Jun. 18, 2019, with English translation.

* cited by examiner

*Primary Examiner* — Padma Haliyur
(74) *Attorney, Agent, or Firm* — Rimon P.C.

(57) ABSTRACT

A driver circuit includes: a first node connected to a first signal line; a first switch transistor provided between a first power supply and a first capacitor; a second switch transistor provided between a second power supply and a second capacitor; a third switch transistor provided between the first capacitor and the first node; and a fourth switch transistor provided between the second capacitor and the first node.

16 Claims, 9 Drawing Sheets

SOLID-STATE IMAGING DEVICE, DISTANCE MEASURING DEVICE, AND DISTANCE MEASURING METHOD

CROSS-REFERENCE TO RELATED APPLICATIONS

This is a continuation of International Application No. PCT/JP2019/013413 filed on Mar. 27, 2019. The entire disclosure of this application is incorporated by reference herein.

BACKGROUND

The present disclosure relates to a solid-state imaging device configured to be able to acquire distance information.

In solid-state imaging devices, efforts have conventionally been focused on taking images with high sensitivity and high definition. Recently, there have appeared solid-state imaging devices that have, in addition to the above capability, a function capable of acquiring distance information from objects. With distance information added to an image, it becomes possible to sense three-dimensional information of a subject to be imaged by a solid-state imaging device. For example, by taking an image of a person, the gesture of the person can be detected three-dimensionally. The device can therefore be used as an input device for various types of equipment. As another example, when mounted in a car, the device can recognize the distance from an object or a person present around the car, and therefore can be applied to collision prevention and automatic driving.

Among a number of methods used for distance measurement from a solid-state imaging device to an object, there is a time-of-flight (ToF) method in which light is emitted from near a solid-state imaging device toward an object and the time taken from the emission until the light returns to the solid-state imaging device after reflected from the object is measured.

To apply the ToF method to a solid-state imaging device, it is essential to expose all pixels to light simultaneously in synchronization with modulation of a light source or a pulse emission time, that is, to provide a global shutter function. Moreover, to detect the distance from an object with a precision of several meters or less, the global shutter must be operated at a speed of 10 ns or less.

Japanese Unexamined Patent Publication No. 2012-217060 discloses a technology on a circuit (driver circuit) that provides a high-speed global shutter function for all pixels. According to this patent document, the voltage supplied to the pixels can be switched from the first voltage to the third voltage at high speed by providing a gate drive circuit for the pixels. In the cited patent document, however, the wiring resistance from the voltage source to a pixel greatly differs with the position of the pixel. For example, the wring resistance value is greater for pixels in a row located in the center of the pixel array than for pixels in a row at an end of the array. That is, since the wiring resistance value for a pixel differs depending on where the pixel is located, the instantaneous behavior at the time of switching differs among pixels. As a result, failing in controlling all pixels simultaneously, there is a possibility of causing a lag in global shutter time with the positions of the pixels and thus affecting the distance detection.

In view of the problem described above, an objective of the present disclosure is providing a solid-state imaging device configured to speed up the driving of pixels while minimizing a lag in the drive timing of the pixels.

SUMMARY

A solid-state imaging device according to one aspect of the present disclosure includes: a plurality of pixels arranged in a matrix; a plurality of first signal lines each connected in common to pixels arranged in a row, among the plurality of pixels; and a driver circuit that supplies voltages to the first signal lines for exposing the plurality of pixels. Each of the pixels outputs a signal when receiving a first voltage through the first signal line and does not output a signal when receiving a second voltage through the first signal line. The driver circuit includes a first node connected to at least one of the plurality of first signal lines, and a driver circuit unit that outputs a voltage to the first node. The driver circuit unit includes a first capacitor that receives the first voltage and supplies the first voltage to the first node, a second capacitor that receives the second voltage and supplies the second voltage to the first node, a first switch transistor provided between the first voltage and the first capacitor, a second switch transistor provided between the second voltage and the second capacitor, a third switch transistor provided between the first capacitor and the first node, and a fourth switch transistor provided between the second capacitor and the first node.

According to the above configuration, it is possible to speed up the driving of pixels while minimizing a lag in the drive timing of the pixels.

DETAILED DESCRIPTION

Embodiments of the present disclosure will be described hereinafter in detail based on the accompanying drawings. It is be noted that the following description of preferred embodiments is essentially mere illustration and by no means intended to limit the present disclosure, its applications, or its uses. For example, while specific block configurations and circuit configurations will be disclosed and description will be made referring to these configurations, such disclosed configurations are merely illustrative and not restrictive.

First Embodiment

—Configuration of Distance Measuring Device—

Figure 1:
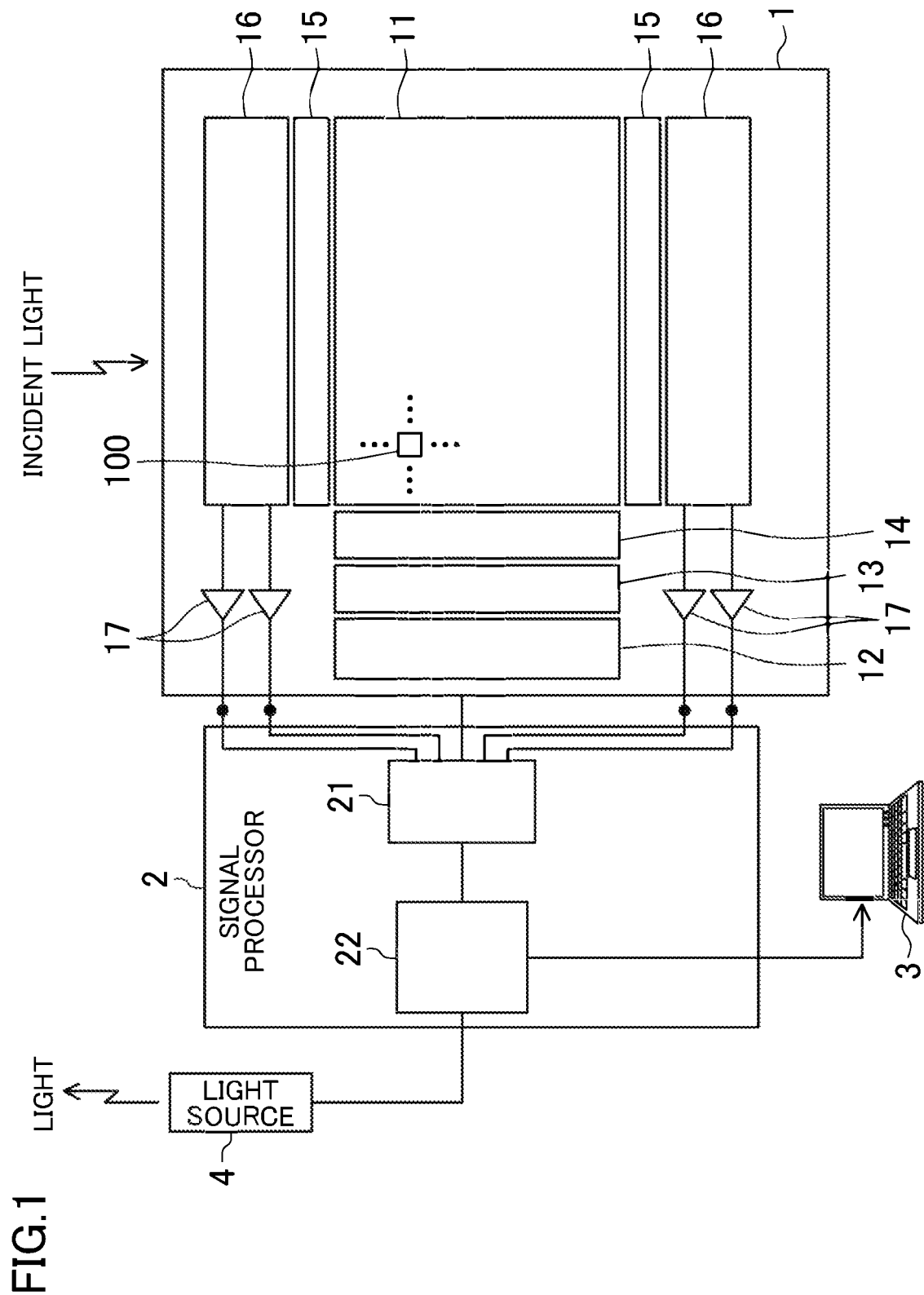
FIG. 1 is a schematic view showing a configuration example of a distance measuring device according to the first embodiment.

FIG. 1 is a schematic view showing a configuration example of a distance measuring device according to the first embodiment. As shown in FIG. 1, the distance measuring device of this embodiment includes a solid-state imaging device 1, a signal processor 2, a computing machine 3, and a light source 4.

The solid-state imaging device 1 includes a pixel array 11, a vertical shift register 12, a multiplexer 13, a driver circuit 14, column circuits 15, horizontal shift registers 16, and output amplifiers 17.

The pixel array 11 includes pixels 100 arranged in a matrix. Each pixel 100 is subjected to exposure according to a voltage supplied from the multiplexer 13 or the driver circuit 14. The pixel 100 also outputs a voltage signal indicating the exposure result according to a selection signal supplied from the multiplexer 13. In the following description, the pixel array 11 is assumed to include N rows of pixels 100.

The vertical shift register 12 transfers voltage signals output from the pixels 100 (i.e., output from the pixels 100 to vertical signal lines 121 to be described later) in the column direction, i.e., to the column circuits 15. The vertical shift register 12 selects a specific row of pixels 100 in the pixel array 11, to allow the pixels 100 to sequentially output voltage signals indicating the exposure results row by row. The vertical shift register 12 outputs an address signal indicating the selected row in the pixel array 11 to the multiplexer 13.

The multiplexer 13 supplies a voltage to the pixels 100 according to the address signal received from the vertical shift register 12, to allow the pixels 100 to output signal charges. The multiplexer 13 also supplies a voltage to the pixels 100 to execute rolling shutter operation in which the pixels 100 are exposed sequentially row by row.

The driver circuit 14 supplies a voltage to the pixels 100 for simultaneous exposure of all pixels 100 in the pixel array 11.

The column circuits 15, receiving the voltage signals transferred from the vertical shift register 12, perform processing such as correlated double sampling (CDS) of removing offset components different among the pixels 100, and output the results to the horizontal shift registers 16.

The horizontal shift registers 16 transfer the signals output from the column circuits 15 sequentially to the output amplifiers 17.

The output amplifiers 17 amplify the signals sequentially received from the horizontal shift registers 16 and output the results to the signal processor 2.

The signal processor 2 includes an analog front end 21 and a logic memory 22.

The analog front end 21 converts the signals output from the output amplifiers 17 of the solid-state imaging device 1 from analog to digital form. The analog front end 21 outputs the converted digital signals to the logic memory 22. The analog front end 21 may change the order of the signals output from the output amplifiers 17 as required.

The logic memory 22 generates distance signals based on the signals received from the analog front end 21. The generated distance signals are output to the computing machine 3.

The computing machine 3, which may be a computer, for example, makes up three-dimensional information on the surroundings of the solid-state imaging device 1 based on the distance signals received from the logic memory 22. Note that the signal processor 2 may make up three-dimensional information on the surroundings of the solid-state imaging device 1 based on the distance signals.

The light source 4 projects light toward a place of which three-dimensional information is desired. The light source 4 includes a built-in mechanism of emitting light to the entire of the place of which three-dimensional information is desired by diffusion of light as required. Light pulsed in the time direction (hereinafter simply called pulsed light) is output from the light source 4. The output time and width of the pulsed light are controlled by the logic memory 22.

—Configuration of Solid-State Imaging Device—

Figure 2:
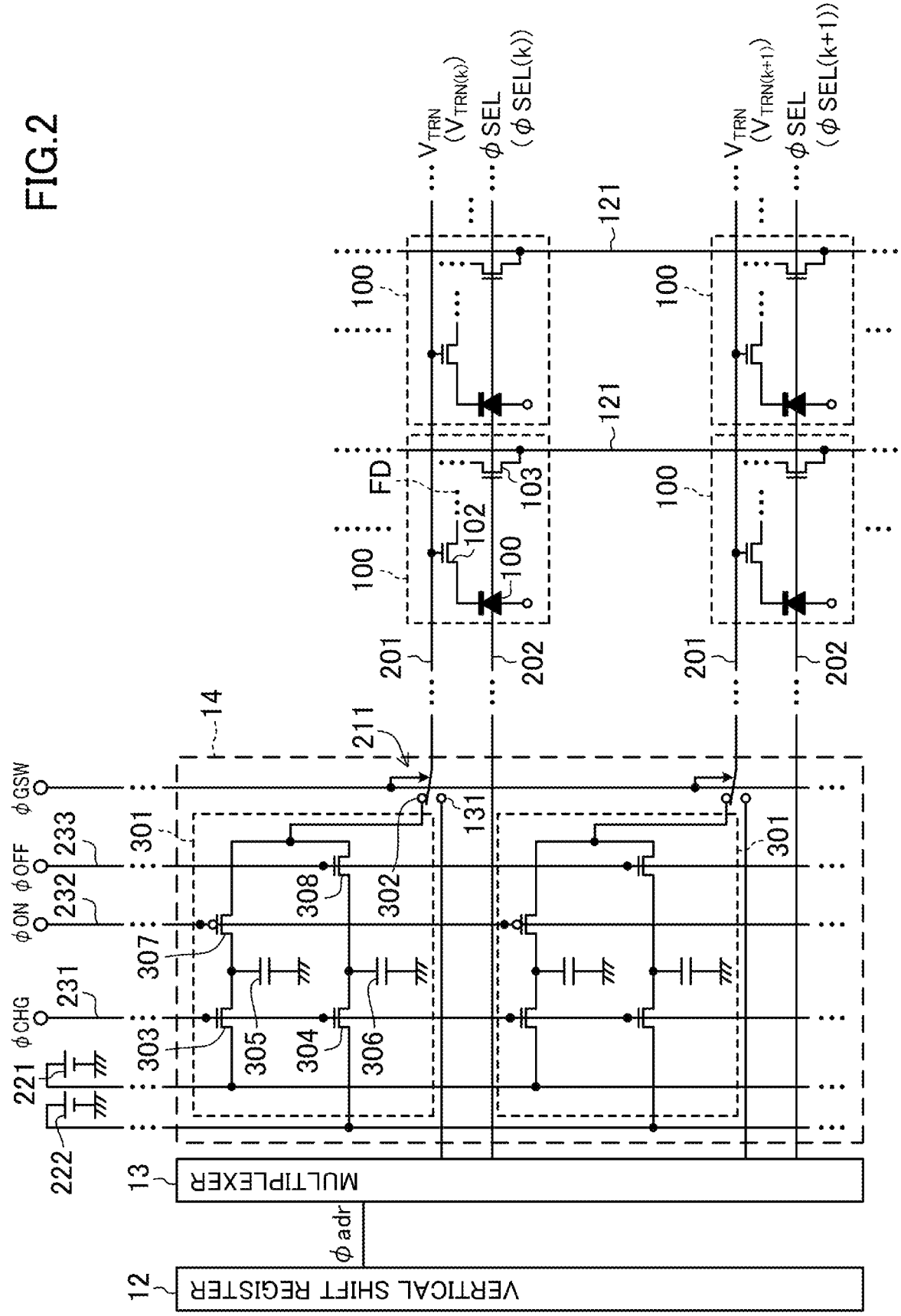
FIG. 2 is a circuit diagram of a solid-state imaging device according to the first embodiment.

FIG. 2 shows a circuit diagram of the solid-state imaging device. Note that part of the solid-state imaging device 1 is omitted in FIG. 2 for ease of explanation of the driver circuit 14. Note also that, in FIG. 2, selection signals input into the k-th and (k+1)th rows of pixels 100 are respectively indicated as selection signals φSEL(k) and φSEL(k+1), and gate voltages $V_{TRN}$ at the k-th and (k+1)th rows of pixels 100 are respectively indicated as gate voltages $V_{TRN}(k)$ and $V_{TRN}(k+1)$.

As shown in FIG. 2, pixels 100 arranged in one row are connected to a same first signal line 201 and a same second signal line 202, and pixels 100 arranged in one column are connected to a same vertical signal line 121. The first signal line 201 is connected with a switch 211, which receives a switch signal φGSW to change the connection of the first signal line 201 to either a first node 302 of the driver circuit 14 or a second node 131 of the multiplexer 13. Specifically, the switch 211 connects the first signal line 201 to the first node 302 of the driver circuit 14 when the switch signal φGSW is high, and connects the first signal line 201 to the second node 131 of the multiplexer 13 when it is low. Note that the wiring width of the first signal line 201 is greater than that of the second signal line 202.

The driver circuit 14 receives a first voltage from an externally provided first power supply 221 and a second voltage lower than the first voltage from an externally provided second power supply 222. The driver circuit 14 also receives a charge signal φCHG from outside through a first gate line 231, and receives a first ON signal φON and a first OFF signal DOFF through second and third gate lines 232 and 233, respectively.

The driver circuit 14 includes a plurality of driver circuit units 301 and a plurality of first nodes 302: one driver circuit unit 301 and one first node 302 are provided to correspond to each of the first signal lines 201.

Each driver circuit unit 301 includes a first switch transistor 303, a second switch transistor 304, a first capacitor 305, a second capacitor 306, a third switch transistor 307, and a fourth switch transistor 308. The first and second switch transistors 303 and 304 and the fourth switch transistor 308 are n-type metal oxide semiconductor (MOS) transistors, and the third switch transistor 307 is a p-type MOS transistor.

The first switch transistor 303 has a source connected to the first power supply 221, a gate connected to the first gate line 231, and a drain connected to one end of the first capacitor 305 and also to the source of the third switch transistor 307. The second switch transistor 304 has a source connected to the second power supply 222, a gate connected to the first gate line 231, and a drain connected to one end of the second capacitor 306 and also to the source of the fourth switch transistor 308. The other ends of the first and second capacitors 305 and 306 are connected to the ground power supply. The third switch transistor 307 has a gate connected to the second gate line 232 and a drain connected to the first node 302 and also to the drain of the fourth switch transistor 308. The fourth switch transistor 308 has a gate connected to the third gate line 233.

The charge signal φCHG is given to the gates of the first and second switch transistors 303 and 304 through the first gate line 231. The first ON signal φON is given to the gate of the third switch transistor 307 through the second gate line 232, and the first OFF signal φOFF is given to the gate of the fourth switch transistor 308 through the third gate line 233. That is, the first and second switch transistors 303 and 304 are switched on or off with the charge signal φCHG. Also, the third switch transistor 307 is switched on or off with the first ON signal φON, and the fourth switch transistor 308 is switched on or off with the first OFF signal φOFF.

The multiplexer 13 includes a plurality of second nodes 131: one second node 131 is provided to correspond to each of the first signal lines 201. In the case of exposing the pixels 100 by the rolling shutter method, the switches 211 change the connection of the first signal lines 201 to the second nodes 131. At this time, the multiplexer 13 supplies the first and second voltages to the second nodes 131 so as to expose the pixels 100 sequentially row by row.

Also, the multiplexer 13, receiving the address signal φadr from the vertical shift register 12, outputs the selection signals φSEL to the pixels 100 through the second signal lines 202. For example, when the address signal φadr indicates that the pixels 100 in the first row have been selected by the vertical shift register 12, the multiplexer 13 outputs a high-level selection signal φSEL to the second signal line 202 to which the pixels 100 in the first row are connected.

As shown in FIG. 2, each pixel 100 includes a photodiode 101, a transfer gate transistor 102, and a selection transistor 103. Although the pixel 100 includes other components such as a reset transistor that resets signal charges inside the pixel 100, they are omitted in FIG. 2 for simplification of explanation.

The photodiode 101 generates signal charges in response to the incident light.

The transfer gate transistor 102, which is an n-type MOS transistor, has a source connected to the photodiode 101 and a gate connected to the first signal line 201. The transfer gate transistor 102 transfers the signal charges generated by the photodiode 101 to floating diffusion FD. Note here that, while the transfer gate transistor 102 transfers the signal charges generated by the photodiode 101 when receiving the first voltage through the first signal line 201, it does not transfer the signal charges when receiving the second voltage through the first signal line 201. That is, the transfer gate transistor 102 performs transfer of the signal charges according to the gate voltage $V_{TRN}$ input at its gate. Thus, the pixel 100 outputs a signal when receiving the first voltage through the first signal line 201, but does not output a signal when receiving the second voltage through the first signal line 201.

The selection transistor 103, which is an n-type MOS transistor, outputs a voltage signal based on the signal charges stored in the floating diffusion FD to the vertical signal line 121 according to the selection signal φSEL input at its gate. For example, the selection transistor 103 has a source connected to the floating diffusion FD, a gate connected to the second signal line 202, and a drain connected to the vertical signal line 121. That is, the selection transistor 103 outputs a voltage signal corresponding to the signal charges stored in the floating diffusion FD to the vertical signal line 121 when the selection signal φSEL received from the multiplexer 13 is high.

Figure 3:
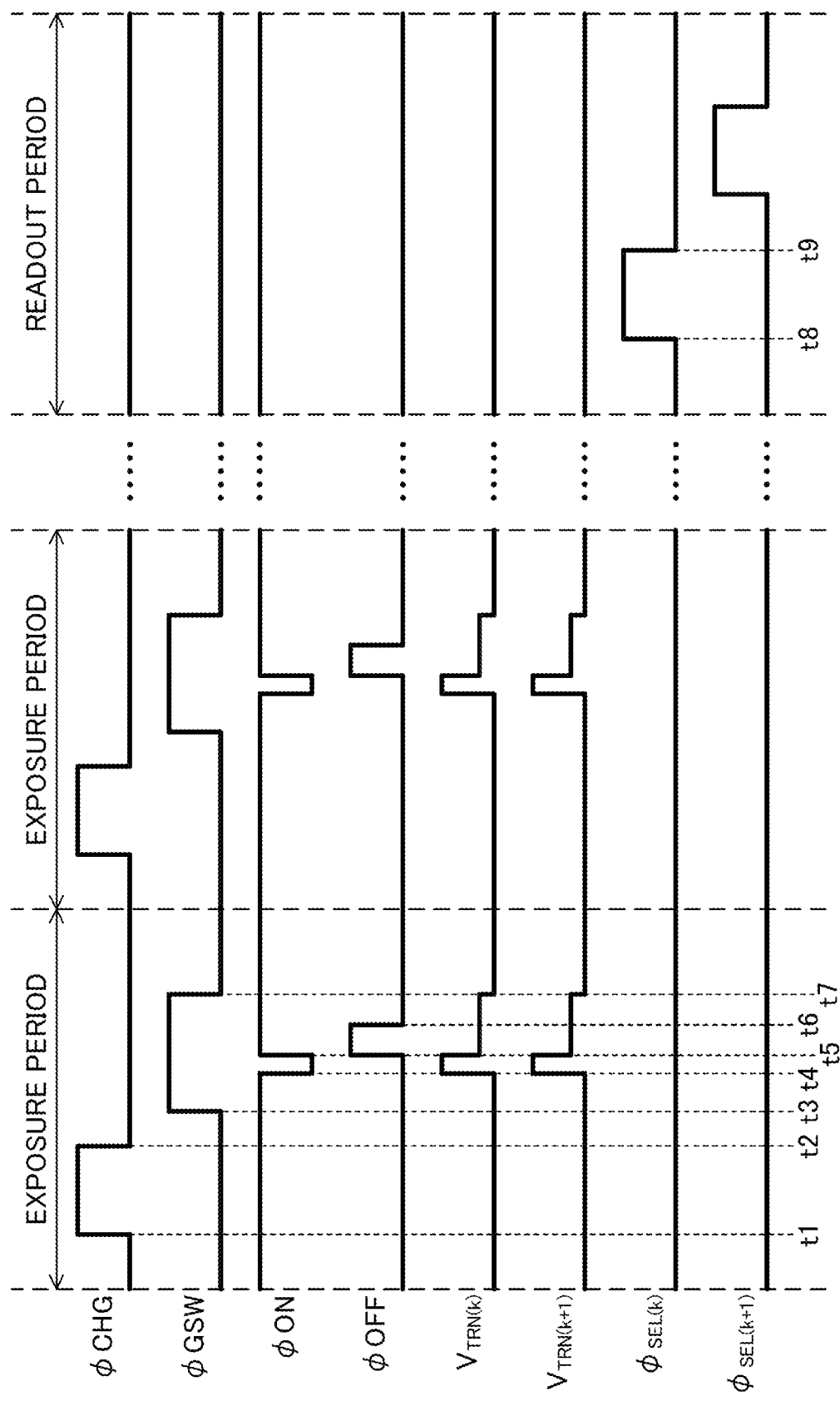
FIG. 3 is a view showing an operation sequence followed when the solid-state imaging device of the first embodiment performs simultaneous exposure.

FIG. 3 shows an operation sequence followed when the solid-state imaging device performs simultaneous exposure (global shutter operation). As shown in FIG. 3, in the simultaneous exposure, the solid-state imaging device 1 first performs the operation shown in an exposure period a plurality of times and then performs the operation shown in a readout period. The solid-state imaging device 1 performs simultaneous exposure of the pixels 100 in the exposure period and outputs voltage signals indicating the exposure results from the pixels 100 in the readout period.

First, the operation of the solid-state imaging device 1 in the exposure period will be described.

In the initial state before time t1, the charge signal φCHG, the switch signal φGSW, the first OFF signal φOFF, and the selection signals φSEL(k) and φSEL(k+1) are low while the first ON signal φON is high. The ground voltage is supplied to the second nodes 131 of the multiplexer 13. Also, the gate voltages $V_{TRN}$, including the gate voltages $V_{TRN}(k)$ and $V_{TRN}(k+1)$, at the pixels 100 in the first to N-th rows are all ground voltages.

At time t1, the charge signal φCHG goes high. This turns on the first and second switch transistors 303 and 304, connecting the first power supply 221 and the first capacitors 305 and also connecting the second power supply 222 and the second capacitors 306. The first voltage is therefore supplied from the first power supply 221 to the first capacitors 305 and the second voltage is supplied from the second power supply 222 to the second capacitors 306. That is, at time t1, charging of the first and second capacitors 305 and 306 is started.

At time t2, the charge signal φCHG goes low. This turns off the first and second switch transistors 303 and 304, stopping the supply of the first voltage from the first power supply 221 to the first capacitors 305 and also stopping the supply of the second voltage from the second power supply 222 to the second capacitors 306. That is, at time t2, the charging of the first and second capacitors 305 and 306 is terminated.

At time t3, the switch signal φGSW goes high. This causes each switch 211 to change the connection of the first signal line 201 from the second node 131 of the multiplexer 13 to the first node 302 of the driver circuit 14.

At time t4, the first ON signal φON goes low. This turns on the third switch transistors 307, each connecting the first capacitor 305 and the first node 302, whereby the first voltage is supplied from the first capacitor 305 to the gates of the transfer gate transistors 102 through the first signal line 201. Thus, the gate voltages $V_{TRN}$, including the gate voltages $V_{TRN}(k)$ and $V_{TRN}(k+1)$, at the pixels 100 in the first to N-th rows become the first voltage, thereby turning on the transfer gate transistors 102 in the pixels 100 in the first to N-th rows. That is, at time t4, the transfer gate transistors 102 start transferring signal charges generated by the photodiodes 101, allowing output of signals from the pixels 100 in the first to N-th rows. At time t4, therefore, simultaneous exposure of the pixels 100 is started.

At time t5, the first ON signal φON and the first OFF signal φOFF go high. This turns off the third switch transistors 307, stopping the supply of the first voltage from the first capacitors 305 to the first nodes 302. Also, the fourth switch transistors 308 are turned on, each connecting the second capacitor 306 and the first node 302, whereby the second voltage is supplied from the second capacitor 306 to the gates of the transfer gate transistors 102 through the first signal line 201. Thus, the gate voltages $V_{TRN}$, including the gate voltages $V_{TRN}(k)$ and $V_{TRN}(k+1)$, at the pixels 100 in the first to N-th rows become the second voltage, and this turns off the transfer gate transistors 102. That is, at time t5, the transfer gate transistors 102 stop the transfer of signal charges generated by the photodiodes 101, stopping the output of signals from the pixels 100 in the first to N-th rows. At time t5, therefore, the simultaneous exposure of the pixels 100 is terminated.

Note that, at time t5, there is a moment when the third switch transistors 307 and the fourth switch transistors 308 are on simultaneously, allowing part of the charge stored in each second capacitor 306 to flow into the first capacitor 305. Therefore, the gate voltages $V_{TRN}$, including the gate voltages $V_{TRN}(k)$ and $V_{TRN}(k+1)$, at the pixels 100 in the first to N-th rows fail to completely change to the second voltage. It is however possible to stop the transfer of signal charges as far as the gate voltage $V_{TRN}$ at each transfer gate transistor 102 at this time is below the threshold voltage of the transfer gate transistor 102.

At time t6, the first OFF signal ϕOFF goes low. This turns off the fourth switch transistors 308, stopping the supply of the second voltage from the second capacitors 306 to the first nodes 302.

At time t7, the switch signal ϕGSW goes low. This causes each switch 211 to change the connection of the first signal line 201 from the first node 302 of the driver circuit 14 to the second node 131 of the multiplexer 13. Thus, the gate voltages $V_{TRN}$, including the gate voltages $V_{TRN}(k)$ and $V_{TRN}(k+1)$, at the pixels 100 in the first to N-th rows change from the second voltage to the ground voltage.

After time t7, the operation in the exposure period is repeated a predetermined number of times.

Next, the operation of the solid-state imaging device 1 in the readout period will be described. Here described will be the operation of the solid-state imaging device 1 at the time of reading voltage signals corresponding to the exposure results from the pixels 100 arranged in the k-th and (k+1)th rows in the readout period.

At time t8, the selection signal ϕSEL(k) goes high. This turns on the selection transistor 103 of each of the pixels 100 arranged in the k-th row, outputting a voltage signal corresponding to signal charges stored in the floating diffusion FD to the corresponding vertical signal line 121.

At time t9, the selection signal ϕSEL(k) goes low. This turns off the selection transistors 103, to terminate the output of the voltage signals from the pixels 100 arranged in the k-th row After time t9, the output of signal charges is performed for the pixels 100 arranged in the (k+1)th row, as was done for the pixels arranged in the k-th row. In this way, during the readout period, the voltage signals of the pixels 100 are output row by row.

With the above configuration, the first switch transistor 303, provided between the first power supply 221 and the first capacitor 305, is switched on or off in response to the charge signal ϕCHG. The second switch transistor 304, provided between the second power supply 222 and the second capacitor 306, is switched on or off in response to the charge signal ϕCHG. The third switch transistor 307, provided between the first capacitor 305 and the first node 302, is switched on or off in response to the first ON signal ϕON. The fourth switch transistor 308, provided between the second capacitor 306 and the first node 302, is switched on or off in response to the first OFF signal ϕOFF. By connecting the first power supply 221 and the first capacitor 305 via the first switch transistor 303, the first capacitor 305 can be charged up to the first voltage. By connecting the second power supply 222 and the second capacitor 306 via the second switch transistor 304, the second capacitor 306 can be charged up to the second voltage. Also, by stopping the supply of the first voltage from the first power supply 221 to the first capacitor 305 via the first switch transistor 303, and connecting the first capacitor 305 and the first node 302 via the third switch transistor 307, the first voltage can be supplied from the first capacitor 305 to the pixels 100 through the first node 302 and the first signal line 201, whereby the pixels 100 can transfer the signal charges, i.e., signals can be output from the pixels 100. Likewise, by stopping the supply of the second voltage from the second power supply 222 to the second capacitor 306 via the second switch transistor 304, and connecting the second capacitor 306 and the first node 302 via the fourth switch transistor 308, the second voltage can be supplied from the second capacitor 306 to the pixels 100 through the first node 302 and the first signal line 201, whereby the pixels 100 can stop the transfer of the signal charges, i.e., the output of signals from the pixels 100 can be stopped. Therefore, at the time of supply of the first voltage to the pixels 100, the pixels 100 are not connected with the first power supply 221, but connected with the first capacitor 305. Likewise, at the time of supply of the second voltage to the pixels 100, the pixels 100 are not connected with the second power supply 222, but connected with the second capacitor 306. This shortens the wiring length from the supply sources of the first and second voltages to the pixels 100, permitting high-speed drive of the pixels 100. Also, having no influence of parasitic components related to wiring other than the wiring from the first and second capacitors 305 and 306 to the pixels 100, it is possible to minimize a lag in the drive timing of a plurality of pixels 100. This makes it possible to speed up the driving of the pixels 100 while minimizing a lag in the drive timing of the pixels 100.

The first voltage is higher than the second voltage. The third switch transistor 307 is a p-type MOS transistor, and the fourth switch transistor 308 is an n-type MOS transistor. Therefore, when the first capacitor 305 has been charged with the first voltage, the third switch transistor 307 can be driven by applying a voltage lower than the first voltage to its gate. Likewise, when the second capacitor 306 has been charged with the second voltage, the fourth switch transistor 308 can be driven by applying a voltage higher than the second voltage to its gate. This makes it possible to reduce the range of voltages required to drive the third and fourth switch transistors 307 and 308.

The capacitance of the second capacitor 306 is greater than that of the first capacitor 305. Therefore, even if the timing at which the first ON signal ϕON goes high lags behind the timing at which the first OFF signal ϕOFF goes high, the second voltage can be supplied to the pixels 100 quickly because of the capacitance of the second capacitor 306 greater than that of the first capacitor 305.

The charge time for the first and second capacitors 305 and 306, or the time from time t1 to time t2, is not specifically limited; for example, it may be set at several μs. It is therefore unnecessary to design such a layout as to reduce the wiring resistance from the first power supply 221 up to the first capacitor 305 and the wiring resistance from the second power supply 222 up to the second capacitor 306. Thus, with no need to increase the width of the wiring from the first power supply 221 up to the first capacitor 305 and the width of the wiring from the second power supply 222 up to the second capacitor 306, the layout area of the solid-state imaging device 1 will not be narrowed. For example, when the capacitances of the first and second capacitors 305 and 306 are each several pF, a wiring resistance of several kΩ each is acceptable.

Note that, to drive the transfer gate transistors 102 of the pixels 100 arranged in a row with the first and second capacitors 305 and 306, the capacitance of each of the first and second capacitors 305 and 306 must be greater than the total of parasitic capacitances included in the route from the first node 302 to the pixels 100.

Also, to operate the pixels 100 at a speed as high as about 1 ns, the wiring resistances from the third and fourth switch transistors 307 and 308 to the gates of the transfer gate transistors 102 must be sufficiently small. For example, assuming that the size of the pixels 100 is about 10 μm in the row and column directions and the number of columns of pixels 100 is about 1000, the wiring width of the first signal lines 201 must be about 500 nm to 1 μm. Also, assuming that the capacitance value of the transfer gate transistors 102 is 0.5 pF, the sheet resistance of the first signal lines 201 is 0.1Ω, and the wiring width thereof is 1 μm, the wiring resistance of the first signal lines 201 will be 11a and thus the time constant will be 0.5 ns. It is therefore possible to operate the pixels 100 at a speed as high as 1 ns.

Also, since it is unnecessary to drive the selection transistors 103 at high speed, the wiring width of the second signal lines 202 can be made smaller than that of the first signal lines 201. It is therefore possible to secure the width of the openings for incoming light for the photodiodes 101.

While one driver circuit unit 301 is provided for one first signal line 201 in this embodiment, the configuration is not limited to this. One driver circuit unit 301 may be provided for a plurality of first signal lines 201.

Second Embodiment

Figure 4:
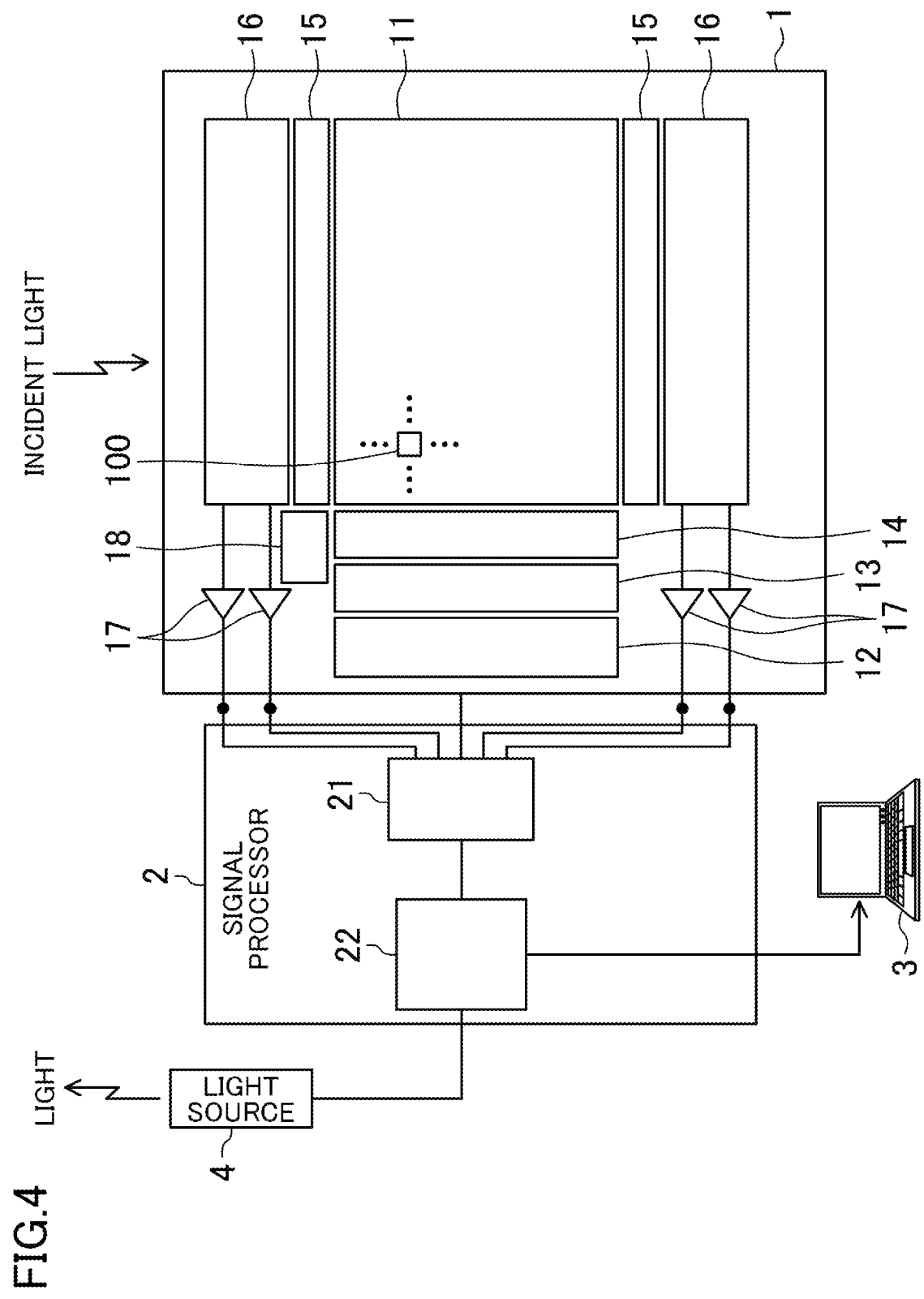
FIG. 4 is a schematic view showing a configuration example of a distance measuring device according to the second embodiment.
Figure 5:
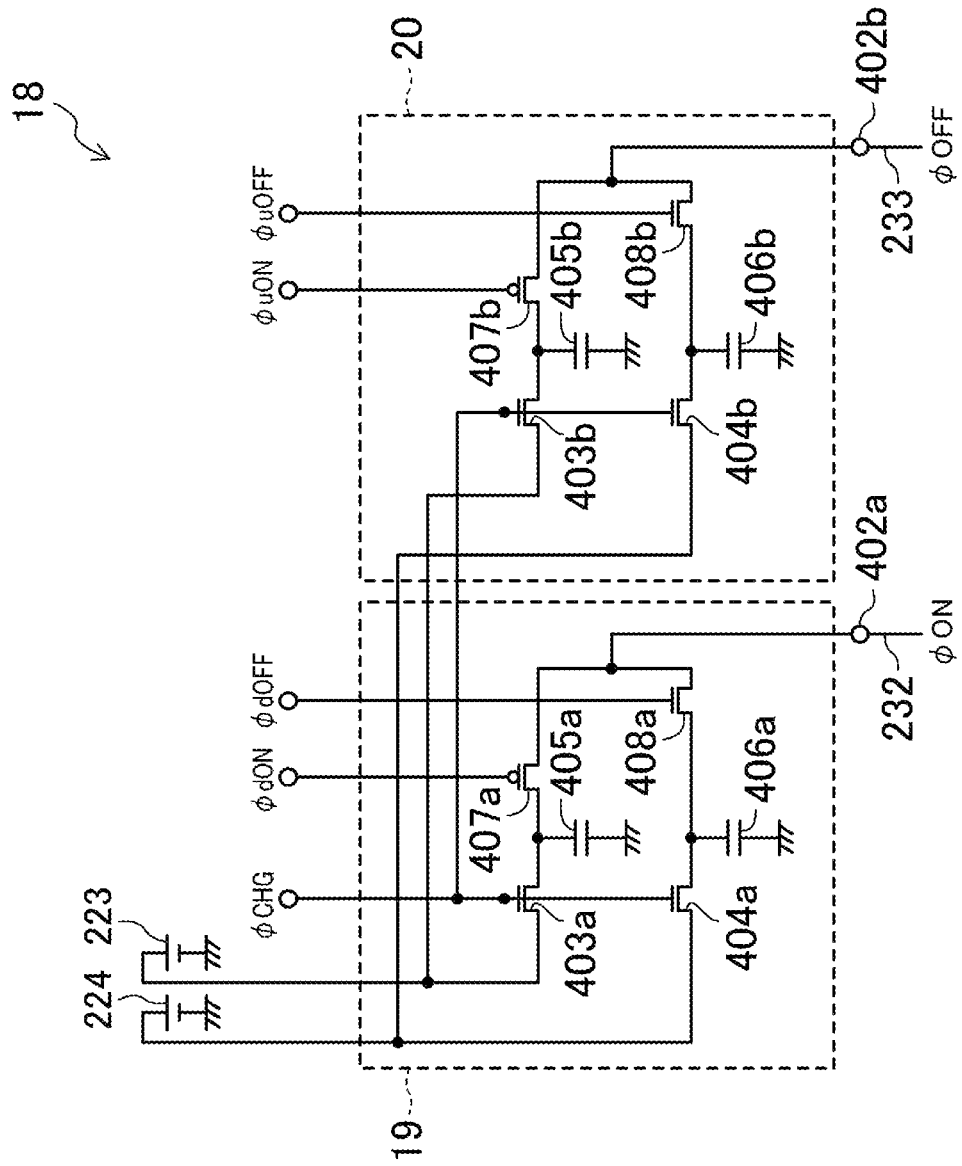
FIG. 5 is a circuit diagram of an auxiliary driver circuit according to the second embodiment.

FIG. 4 is a schematic view showing a configuration example of a distance measuring device according to the second embodiment, and FIG. 5 is a circuit diagram of an auxiliary driver circuit. As shown in FIG. 4, the solid-state imaging device 1 further includes an auxiliary driver circuit 18.

The auxiliary driver circuit 18 outputs the first ON signal ϕON and the first OFF signal ϕOFF to the driver circuit 14 through the second and third gate lines 232 and 233, respectively.

Specifically, the auxiliary driver circuit 18 receives voltages from third and fourth power supplies 223 and 224 provided externally. The third power supply 223 supplies a third voltage and the fourth power supply 224 supplies a fourth voltage lower than the third voltage. The third and fourth voltages may be the same as the first and second voltages, respectively, or may be different from each other.

The auxiliary driver circuit 18 includes an ON signal generation circuit 19 that generates the first ON signal ϕON and an OFF signal generation circuit 20 that generates the first OFF signal ϕOFF.

The ON signal generation circuit 19 includes a third node 402a, a fifth switch transistor 403a, a sixth switch transistor 404a, a third capacitor 405a, a fourth capacitor 406a, a seventh switch transistor 407a, and an eighth switch transistor 408a. The fifth and sixth switch transistors 403a and 404a and the eighth switch transistor 408a are n-type MOS transistors, and the seventh switch transistor 407a is a p-type MOS transistor.

The fifth switch transistor 403a has a source connected to the third power supply 223 and a drain connected to one end of the third capacitor 405a and also to the source of the seventh switch transistor 407a, and receives the charge signal ϕCHG at its gate. The sixth switch transistor 404a has a source connected to the fourth power supply 224 and a drain connected to one end of the fourth capacitor 406a and also to the source of the eighth switch transistor 408a, and receives the charge signal ϕCHG at its gate. The other ends of the third and fourth capacitors 405a and 406a are connected to the ground power supply. The seventh switch transistor 407a has a drain connected to the third node 402a and also to the drain of the eighth switch transistor 408a, and receives a second ON signal ϕdON at its gate. The eighth switch transistor 408a receives a second OFF signal ϕdOFF at its gate. The third node 402a is connected to the second gate line 232 and, through the second gate line 232, connected to the third switch transistor 307 of the driver circuit 14.

The OFF signal generation circuit 20 has a configuration roughly the same as the ON signal generation circuit 19 except that the signals input into the gates of the seventh and eighth switch transistors and the line to which the third node is connected are different.

Specifically, the OFF signal generation circuit 20 includes a third node 402b, a fifth switch transistor 403b, a sixth switch transistor 404b, a third capacitor 405b, a fourth capacitor 406b, a seventh switch transistor 407b, and an eighth switch transistor 408b. The seventh switch transistor 407b receives a third ON signal ϕuON at its gate. The eighth switch transistor 408b receives a third OFF signal ϕuOFF at its gate. The third node 402b is connected to the third gate line 233 and, through the third gate line 233, connected to the fourth switch transistor 308 of the driver circuit 14.

Figure 6:
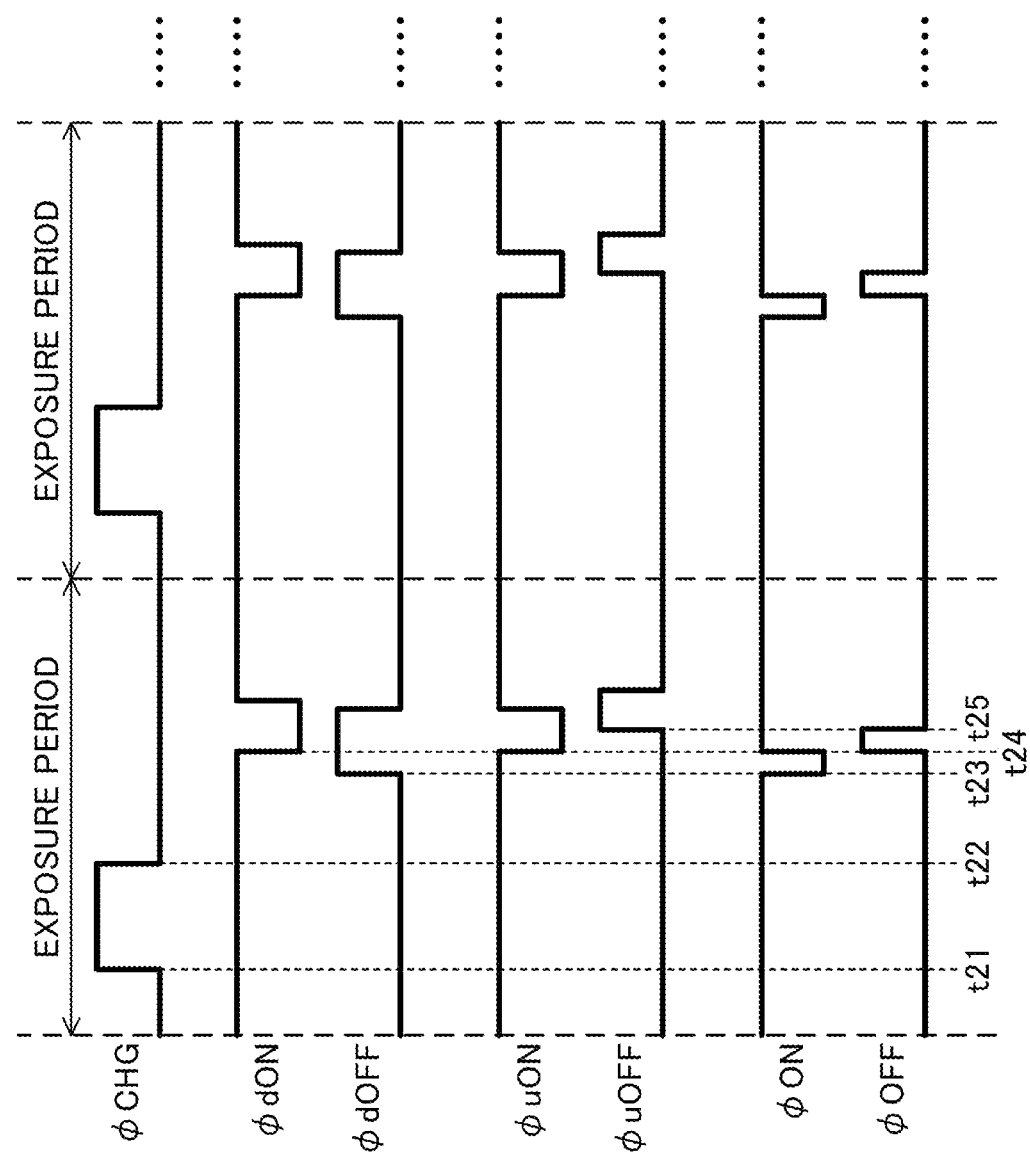
FIG. 6 is a view showing an operation sequence of the auxiliary driver circuit in an exposure period in FIG. 3.

FIG. 6 shows an operation sequence of the auxiliary driver circuit in the exposure period in FIG. 3.

In the initial state before time t21, the charge signal ϕCHG, the second OFF signal ϕdOFF, the third OFF signal ϕuOFF, and the first OFF signal ϕOFF are low while the second ON signal ϕdON, the third ON signal ϕuON, and the first ON signal ϕON are high.

At time t21, the charge signal ϕCHG goes high. This turns on the fifth switch transistors 403a and 403b and the sixth switch transistors 404a and 404b, connecting the third power supply 223 and the third capacitors 405a and 405b and also connecting the fourth power supply 224 and the fourth capacitors 406a and 406b. That is, the third voltage is supplied from the third power supply 223 to the third capacitors 405a and 405b, and the fourth voltage is supplied from the fourth power supply 224 to the fourth capacitors 406a and 406b. At time t21, therefore, charging of the third capacitors 405a and 405b and the fourth capacitors 406a and 406b is started.

At time t22, the charge signal ϕCHG goes low. This turns off the fifth switch transistors 403a and 403b and the sixth switch transistors 404a and 404b, stopping the supply of the third voltage from the third power supply 223 to the third capacitors 405a and 405b and the supply of the fourth voltage from the fourth power supply 224 to the fourth capacitors 406a and 406b. That is, at time t22, the charging of the third capacitors 405a and 405b and the fourth capacitors 406a and 406b is terminated.

At time t23, the second OFF signal ϕdOFF goes high. This turns on the eighth switch transistor 408a in the ON signal generation circuit 19, connecting the fourth capacitor 406a and the third node 402a, whereby the fourth voltage is supplied from the fourth capacitor 406a to the third node 402a. That is, at time t23, the first ON signal ϕON becomes low, turning on the third switch transistors 307 in the driver circuit 14. Note that time t23 corresponds to time t4 in FIG. 3.

At time t24, the second ON signal ϕdON and the third ON signal ϕuON go low. In the ON signal generation circuit 19, this turns on the seventh switch transistor 407a, connecting the third capacitor 405a and the third node 402a, whereby the third voltage is supplied from the third capacitor 405a to the third node 402a. That is, the first ON signal ϕON becomes high, turning off the third switch transistors 307 in the driver circuit 14.

In the OFF signal generation circuit 20, the seventh switch transistor 407b is turned on, connecting the third capacitor 405b and the third node 402b, whereby the third voltage is supplied from the third capacitor 405b to the third node 402b. That is, the first OFF signal ϕOFF becomes high, turning on the fourth switch transistors 308 in the driver circuit 14. Note that time t24 corresponds to time t5 in FIG. 3.

At time t25, the third OFF signal ϕuOFF goes high. In the OFF signal generation circuit 20, this turns on the eighth switch transistor 408b, connecting the fourth capacitor 406b and the third node 402b, whereby the fourth voltage is supplied from the fourth capacitor 406b to the third node 402b. That is, the first OFF signal ϕOFF becomes low, turning off the fourth switch transistors 308 in the driver circuit 14. Note that time t25 corresponds to time t6 in FIG. 3.

After time t25, by sequentially changing the second OFF signal ϕdOFF to the low level, the second ON signal ϕdON to the high level, the third ON signal ϕuON to the high level, and the third OFF signal ϕuOFF to the low level, the initial state before time t21 resumes.

As described above, the solid-state imaging device 1 includes the auxiliary driver circuit 18 that controls the third switch transistors 307 and the fourth switch transistors 308 in the driver circuit 14. The ON signal generation circuit 19 of the auxiliary driver circuit 18 outputs the ON signal ϕON to the gates of the third switch transistors 307 through the third node 402a and the second gate line 232. The OFF signal generation circuit 20 of the auxiliary driver circuit 18 outputs the OFF signal ϕOFF to the gates of the fourth switch transistors 308 through the third node 402b and the third gate line 233. With this configuration, even though a number of driver circuit units 301 are provided in the driver circuit 14, it is possible to speed up the driving of the third and fourth switch transistors 307 and 308 while minimizing a lag in the drive timing of the third switch transistors 307 and the drive timing of the fourth switch transistors 308.

Note that, to drive the third switch transistors 307 of the driver circuit 14 simultaneously, the capacitance of the fourth capacitor 406a of the ON signal generation circuit 19 is set to be greater than the total of parasitic capacitances in the route from the third capacitor 405a to the third switch transistors 307. Also, to drive the third switch transistors 307 at high speed, the wiring resistance of the second gate line 232 is designed so that the time constant as the product of the wiring resistance and the above parasitic capacitances be ns or less.

Third Embodiment

Figure 7:
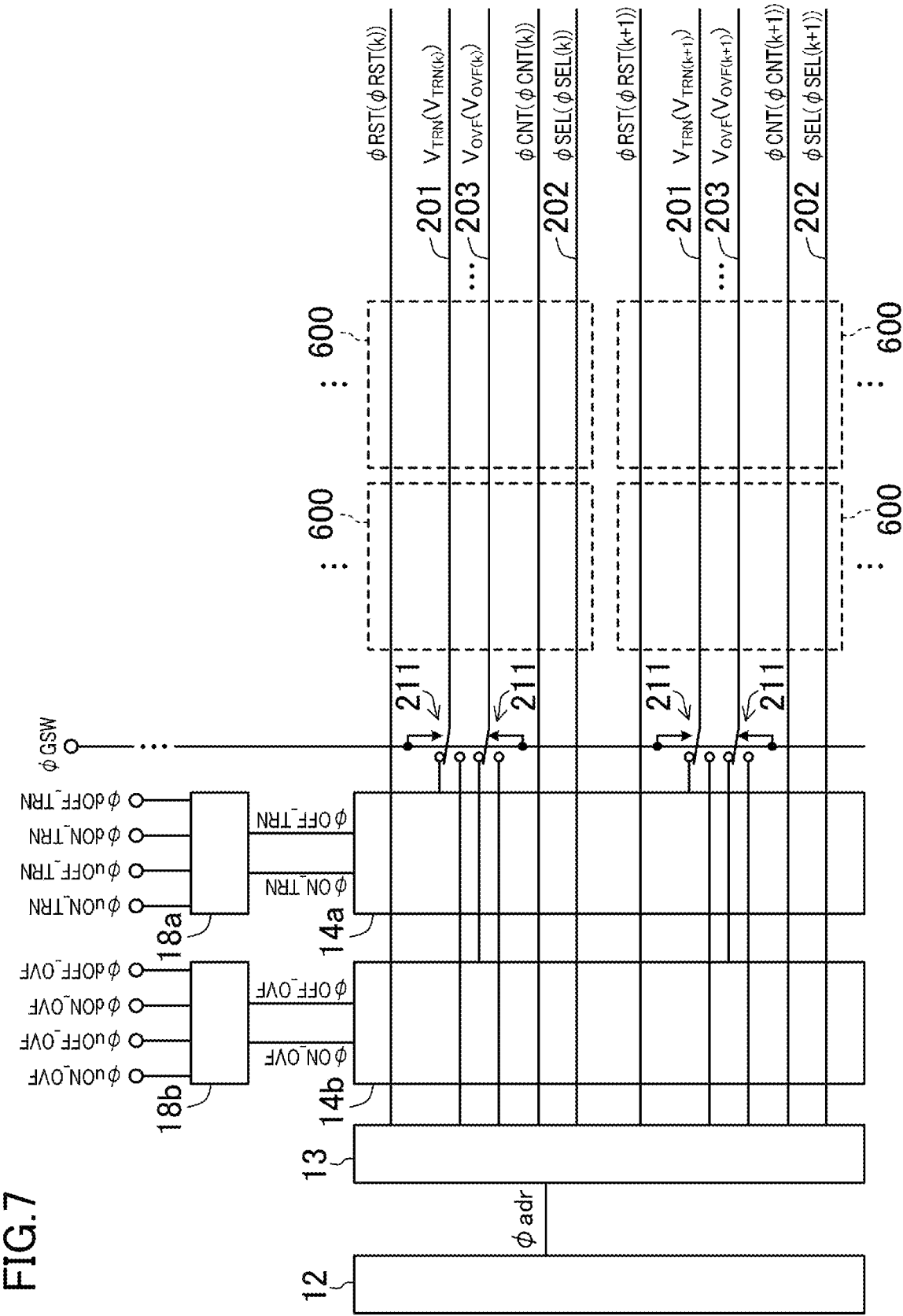
FIG. 7 is a circuit diagram of a solid-state imaging device according to the third embodiment.
Figure 8:
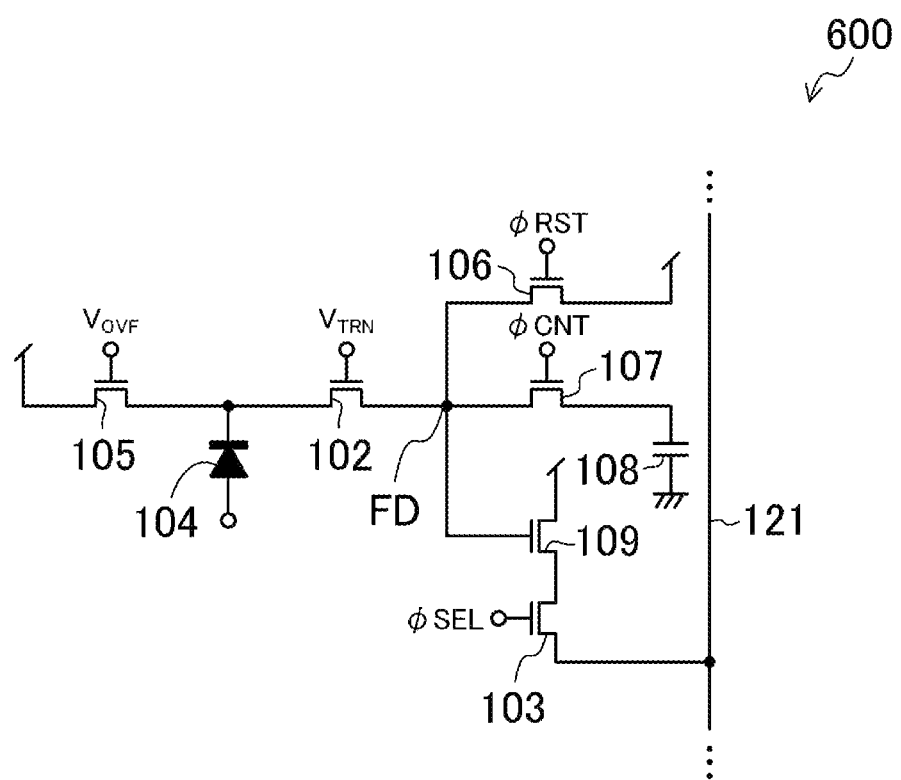
FIG. 8 is a circuit diagram of a pixel in the solid-state imaging device according to the third embodiment.

FIG. 7 shows a circuit diagram of a solid-state imaging device according to the third embodiment, and FIG. 8 shows a circuit diagram of a pixel in the solid-state imaging device according to the third embodiment. Note that, in FIG. 7, the gate voltage input into the gate of an overflow transistor 105, the gate voltage input into the gate of the transfer gate transistor 102, the reset signal input into the gate of a reset transistor 106, the count signal input into the gate of a counter transistor 107, and the selection signal input into the gate of the selection transistor 103 in each of pixels 600 in the k-th row are respectively indicated as the gate voltage $V_{OVF}(k)$, the gate voltage $V_{TRN}(k)$, the reset signal ϕRST(k), the count signal ϕCNT(k), and the selection signal ϕSEL(k). In FIG. 7, also, the gate voltage input into the gate of the overflow transistor 105, the gate voltage input into the gate of the transfer gate transistor 102, the reset signal input into the gate of the reset transistor 106, the count signal input into the gate of the counter transistor 107, and the selection signal input into the gate of the selection transistor 103 in each of pixels 600 in the (k+1)th row are respectively indicated as the gate voltage $V_{OVF}(k+1)$, the gate voltage $V_{TRN}(k+1)$, the reset signal ϕRST(k+1), the count signal ϕCNT(k+1), and the selection signal ϕSEL(k+1).

As shown in FIGS. 7 and 8, the solid-state imaging device 1 according to the third embodiment includes a plurality of pixels 600 arranged in a matrix. Each pixel 600 includes an avalanche photodiode 104, the overflow transistor 105, the transfer gate transistor 102, the reset transistor 106, the count transistor 107, a memory capacitor 108, an amplifying transistor 109, and the selection transistor 103. All of these transistors are n-type MOS transistors.

The avalanche photodiode 104 performs photoelectric conversion of converting incident light into signal charges. When generating one signal charge by photoelectric conversion, the avalanche photodiode 104 amplifies the signal charge into several tens to hundreds of thousands of charges.

The overflow transistor 105 has a source connected to the avalanche photodiode 104, a drain connected to a reset drain, and a gate connected to a third signal line 203. When the first voltage is applied to the gate, the overflow transistor 105 is turned on, connecting the avalanche photodiode 104 and the reset drain to discharge the signal charges generated by the avalanche photodiode 104 to the reset drain.

The transfer gate transistor 102 has a source connected to the avalanche photodiode 104, a drain connected to the floating diffusion FD, and a gate connected to the first signal line 201. When the first voltage is applied to the gate, the transfer gate transistor 102 is turned on, connecting the avalanche photodiode 104 and the floating diffusion FD to transfer the signal charges generated by the avalanche photodiode 104 to the floating diffusion FD.

The reset transistor 106 has a source connected to the floating diffusion FD and a drain connected to a reset drain, and receives the reset signal ϕRST output from the multiplexer 13 at its gate. When the reset signal ϕRST is high, the reset transistor 106 is turned on, connecting the floating diffusion FD and the reset drain to discharge the signal charges in the floating diffusion FD to the reset drain.

The count transistor 107 has a source connected to the floating diffusion FD and a drain connected to one end of the memory capacitor 108, and receives the count signal ϕCNT output from the multiplexer 13 at its gate. The ground voltage is connected to the other end of the memory capacitor 108. When the count signal ϕCNT is high, the count transistor 107 connects the floating diffusion FD and the memory capacitor 108 to transfer the signal charges stored in the floating diffusion FD to the memory capacitor 108. That is, the signal charges are transferred to the memory capacitor 108 through the count transistor 107 every time the count signal ϕCNT goes high. In short, the signal charges based on the exposure results are accumulated in the memory capacitor 108.

The amplifying transistor 109, connected to the floating diffusion FD at its gate, amplifies the voltage at the floating diffusion FD and outputs the result from its drain.

The selection transistor 103 has a source connected to the drain of the amplifying transistor 109 and a drain connected to the vertical signal line 121, and receives the selection signal φSEL at its gate. When the selection signal φSEL is high, the selection transistor 103 is turned on, outputting the voltage at its drain to the vertical signal line 121. That is, the selection transistor 103 outputs the voltage signal corresponding to the exposure result at the avalanche photodiode 104 to the vertical signal line 121.

The solid-state imaging device 1 also includes: a first driver circuit 14a that supplies the gate voltages $V_{TRN}$ to the gates of the transfer gate transistors 102 through the first signal lines 201; a second driver circuit 14b that supplies the gate voltages $V_{OVF}$ to the gates of the overflow transistors 105 through the third signal lines 203; a first auxiliary driver circuit 18a that sends a first ON signal φON_TRN and a first OFF signal φOFF_TRN to the first driver circuit 14a; a second auxiliary driver circuit 18b that sends a first ON signal φON_OVF and a first OFF signal φOFF_OVF to the second driver circuit 14b; the multiplexer 13 that sends the reset signal φRST, the count signal φCNT, and the selection signal φSEL to the pixels 600; and a vertical shift register 12 that sends an address signal φadr to the multiplexer 13. Note that the first and second driver circuits 14a and 14b have the same circuit configuration as the driver circuit 14, and the first and second auxiliary driver circuits 18a and 18b have the same circuit configuration as the auxiliary driver circuit 18. Note also that, in FIG. 7, the second ON signal, the second OFF signal, the third ON signal, and the third OFF signal input into the first auxiliary driver circuit 18a are respectively indicated as a second ON signal φdON_TRN, a second OFF signal φdOFF_TRN, a third ON signal φuON_TRN, and a third OFF signal φuOFF_TRN. Likewise, the second ON signal, the second OFF signal, the third ON signal, and the third OFF signal input into the second auxiliary driver circuit 18b are respectively indicated as a second ON signal φdON_OVF, a second OFF signal φdOFF_OVF, a third ON signal φuON_OVF, and a third OFF signal φuOFF_OVF.

Figure 9:
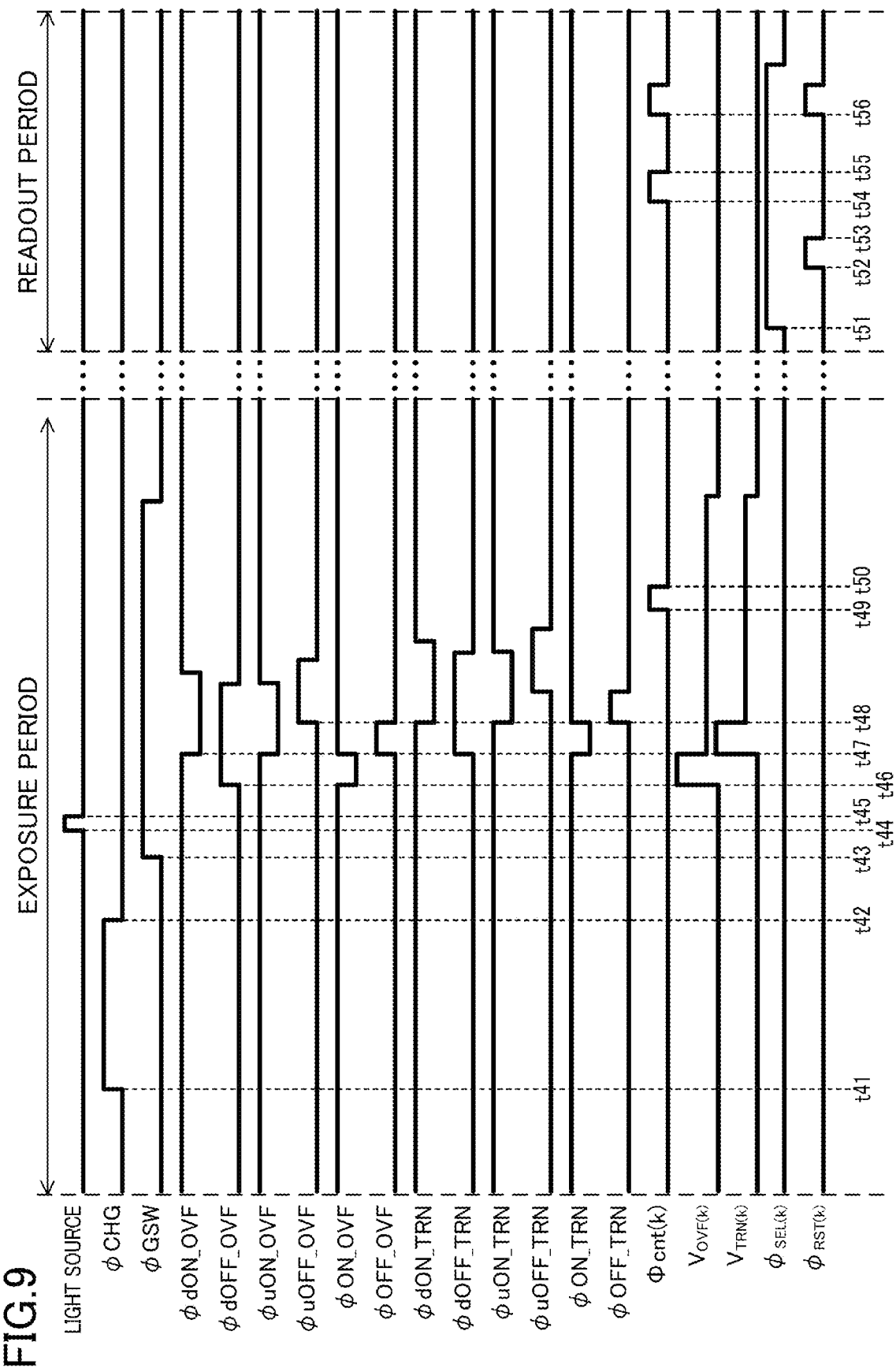
FIG. 9 is a view showing an operation sequence followed when a distance measuring device according to the third embodiment performs simultaneous exposure.

FIG. 9 shows an operation sequence followed when a distance measuring device of this embodiment performs simultaneous exposure.

First, the operation of the distance measuring device in the exposure period will be described.

In the initial state before time t41, the charge signal φCHG, the switch signal φGSW, the first OFF signals φOFF_OVF and φOFF_TRN, the second OFF signals φdOFF_OVF and φdOFF_TRN, and the third OFF signals φuOFF_OVF and φuOFF_TRN are low, and the first ON signals φON_OVF and φON_TRN, the second ON signals φdON_OVF and φdON_TRN, and the third ON signals φuON_OVF and φuON_TRN are high. The ground voltage is supplied to the second nodes 131 of the multiplexer 13.

Also, the gate voltages $V_{TRN}$ and $V_{OVF}$, including the gate voltages $V_{TRN}(k)$ and $V_{OVF}(k)$, for the pixels 600 in the first to N-th rows are all ground voltages. The count signals φCNT, the selection signals φSEL, and the reset signals φRST, including the count signal φCNT(k), the selection signal φSEL(k), and the reset signal φRST(k), for the pixels 600 in the first to N-th rows are all low.

At time t41, the charge signal φCHG goes high. This turns on the first and second switch transistors 303 and 304 in the first and second driver circuits 14a and 14b, connecting the first power supply 221 and the first capacitors 305 and also connecting the second power supply 222 and the second capacitors 306. This also turns on the fifth and sixth switch transistors 403a, 403b, 404a, and 404b in the first and second auxiliary driver circuits 18a and 18b, connecting the third power supply 223 and the third capacitors 405a and 405b and also connecting the fourth power supply 224 and the fourth capacitors 406a and 406b. That is, at time t41, charging of the first to fourth capacitors 305, 306, 405a, 405b, 406a, and 406b is started.

At time t42, the charge signal φCHG goes low. This turns off the first and second switch transistors 303 and 304 in the first and second driver circuits 14a and 14b, stopping the supply of the first voltage from the first power supply 221 to the first capacitors 305 and also stopping the supply of the second voltage from the second power supply 222 to the second capacitors 306. This also turns off the fifth and sixth switch transistors 403a, 403b, 404a, and 404b in the first and second auxiliary driver circuits 18a and 18b, stopping the supply of the third voltage from the third power supply 223 to the third capacitors 405a and 405b and also stopping the supply of the fourth voltage from the fourth power supply 224 to the fourth capacitors 406a and 406b. That is, at time t42, the charging of the first to fourth capacitors 305, 306, 405a, 405b, 406a, and 406b is terminated.

At time t43, the switch signal φGSW goes high. This causes each switch 211 to change the connection of the first signal line 201 to the first node 302 in the first driver circuit 14a, and also causes each switch 211 to change the connection of the third signal line 203 to the first node 302 in the second driver circuit 14b.

During time t44 to t45, pulsed light is emitted from the light source 4 to an object. At time t46, the second OFF signal φdOFF_OVF goes high. This turns on the eighth switch transistor 408a in the second auxiliary driver circuit 18b, connecting the fourth capacitor 406a and the third node 402a, whereby the first ON signal φON_OVF becomes low. With this, the third switch transistors 307 in the second driver circuit 14b are turned on, connecting the first capacitors 305 and the first nodes 302. That is, the first voltage is supplied to the gates of the overflow transistors 105 in the pixels 600 through the third signal lines 203. Thus, since the gate voltages $V_{OVF}$, including the gate voltage $V_{OVF}(k)$, for the pixels 600 in the first to the N-th rows become the first voltage, the overflow transistors 105 are turned on, connecting the reset drain and the avalanche photodiodes 104, whereby signal charges in the avalanche photodiodes 104 in the pixels 600 in the first to N-th rows are discharged to the reset drain.

At time t47, the second ON signal φdON_OVF and the third ON signal φuON_OVF go low, and the second OFF signal φdOFF_TRN goes high.

This turns on the seventh switch transistor 407a in the ON signal generation circuit 19 of the second auxiliary driver circuit 18b, connecting the third capacitor 405a and the third node 402a, whereby the first ON signal φON_OVF becomes high. With this, the third switch transistors 307 in the second driver circuit 14b are turned off, stopping the supply of the first voltage from the first capacitors 305 to the first nodes 302. Also, in the OFF signal generation circuit 20 of the second auxiliary driver circuit 18b, the seventh switch transistor 407b is turned on, connecting the third capacitor 405b and the third node 402b, whereby the first OFF signal φOFF_OVF becomes high. With this, the fourth switch transistors 308 in the second driver circuit 14b are turned on, connecting the second capacitors 306 and the first nodes 302. That is, the second voltage is supplied to the gates of the overflow transistors 105 in the pixels 600 through the third signal lines 203. Thus, since the gate voltages Vow, including the gate voltage $V_{OVF}(k)$, for the pixels 600 in the first to the N-th rows become the second voltage, the overflow transistors 105 are turned off, whereby the reset drain and the avalanche photodiodes 104 are not connected in the pixels 600 in the first to N-th rows.

Also, in the ON signal generation circuit 19 of the first auxiliary driver circuit 18a, the eighth switch transistor 408a is turned on, connecting the fourth capacitor 406a and the third node 402a, whereby the first ON signal φON_TRN becomes low. With this, the third switch transistors 307 in the first driver circuit 14a are turned on, connecting the first capacitors 305 and the first nodes 302. That is, the first voltage is supplied to the gates of the transfer gate transistors 102 in the pixels 600 through the first signal lines 201. Thus, since the gate voltages $V_{TRN}$, including the gate voltage $V_{TRN}(k)$, for the pixels 600 in the first to the N-th rows become the first voltage, the transfer gate transistors 102 are turned on, starting transfer of the signal charges from the avalanche photodiodes 104 to the floating diffusion FD, to allow output of signals from the pixels 600 in the first to N-th rows. That is, at time t47, simultaneous exposure of the pixels 600 is started.

At time t48, the third OFF signal φuOFF_OVF goes high, and the second ON signal φdON_TRN and the third ON signal φuON_TRN go low.

This turns on the eighth switch transistor 408b in the OFF signal generation circuit 20 of the second auxiliary driver circuit 18b, connecting the fourth capacitor 406b and the third node 402b, whereby the first OFF signal φOF_OVF becomes low. With this, the fourth switch transistors 308 in the second driver circuit 14b are turned off, stopping the supply of the second voltage from the second capacitors 306 to the first nodes 302.

Also, in the ON signal generation circuit 19 of the first auxiliary driver circuit 18a, the seventh switch transistor 407a is turned on, connecting the third capacitor 405a and the third node 402a, whereby the first ON signal φON_TRN becomes high. With this, the third switch transistors 307 in the first driver circuit 14a are turned off, stopping the supply of the first voltage from the first capacitors 305 to the first nodes 302. On the other hand, in the OFF signal generation circuit 20 of the first auxiliary driver circuit 18a, the seventh switch transistor 407b is turned on, connecting the third capacitor 405b and the third node 402b, whereby the first OFF signal φOFF_TRN becomes high. With this, the fourth switch transistors 308 in the first driver circuit 14a are turned on, connecting the second capacitors 306 and the first nodes 302. That is, the second voltage is supplied to the gates of the transfer gate transistors 102 in the pixels 600 through the first signal lines 201. Thus, since the gate voltages $V_{TRN}$, including the gate voltage $V_{TRN}(k)$, for the pixels 600 in the first to the N-th rows become the second voltage, the transfer gate transistors 102 are turned off, stopping the transfer of the signal charges from the avalanche photodiodes 104 to the floating diffusion FD. That is, at time t48, the simultaneous exposure of the pixels 600 is terminated.

After time t48, the second ON signals φdON_OVF and φdON_TRN, the second OFF signals φdOFF_OVF and φdOFF_TRN, the third ON signals φuON_OVF and φuON_TRN, and the third OFF signals φuOFF_OVF and φuOFF_TRN are sequentially returned to their initial states.

During time t49 to t50, the count signals φCNT, including the count signal φCNT(k), for the pixels 600 in the first to N-th rows go high. This turns on the count transistors 107, each allowing transfer of the signal charges from the floating diffusion FD to the memory capacitor 108. The memory capacitor 108 stores the signal charges transferred from the floating diffusion FD.

Thereafter, the operation in the exposure period is repeated a predetermined number of times. That is, in the distance measuring device according to this embodiment, the simultaneous exposure of the pixels 600 is repeated a plurality of times, and the signal charges indicating the exposure results are accumulated in the memory capacitors 108.

Here in the case of exposing an object at a distance d from the distance measuring device of this embodiment, the time from time t44 to time t47 is set as follows:

$$\frac{2d}{c}$$

where c is the light speed.

In this case, when the time from time t46 to time t47 is h, any object in the range from the distance d to the following distance is to be exposed.

$$\frac{2h}{c}$$

That is, as h is shorter, the distance from the object can be calculated more precisely.

Next, the operation of the distance measuring device in the readout period will be described. Here described will be the operation of reading the signal charges corresponding to the exposure results from the pixels 600 arranged in the k-th row.

At time t51, the selection signal φSEL(k) goes high. This turns on the selection transistor 103 in each pixel 600, connecting the amplifying transistor 109 and the vertical signal line 121.

At time t52, the reset signal φRST(k) goes high. This turns on the reset transistor 106, connecting the floating diffusion FD and the reset drain, whereby the signal charges stored in the floating diffusion FD are discharged to the reset drain.

At time t53, the reset signal φRST(k) goes low. This turns off the reset transistor 106, whereby the floating diffusion FD and the reset drain are not connected.

At time t54, the count signal φCNT(k) goes high. This turns on the count transistor 107, connecting the memory capacitor 108 and the floating diffusion FD. That is, the signal charges corresponding to the voltage at the memory capacitor 108 are supplied to the floating diffusion FD. With this, the amplifying transistor 109 amplifies the voltage at the floating diffusion FD and outputs the result to the selection transistor 103. The selection transistor 103 outputs the voltage received from the amplifying transistor 109 to the vertical signal line 121. That is, each pixel 600 outputs the voltage signal corresponding to the signal charges accumulated in the memory capacitor 108 to the vertical signal line 121.

At time t55, the count signal φCNT(k) goes low. This turns off the count transistor 107, whereby the memory capacitor 108 and the floating diffusion FD are not connected.

At time t56, the reset signal φRST(k) and the count signal φCNT(k) go high. This turns on the reset transistor 106 and the count transistor 107, whereby signal charges in the memory capacitor 108 and the floating diffusion FD are discharged to the reset drain. That is, the voltage at the memory capacitor 108 and the floating diffusion FD is reset.

After time t56, the reset signal φRST(k), the count signal φCNT(k), and the selection signal φSEL(k) go low, returning to their initial states. Thereafter, similar operation is performed for each row of pixels 600, to output voltage signals from the pixels 600.

As described above, the distance measuring device includes the solid-state imaging device 1 and the light source 4. The solid-state imaging device 1 includes the pixels 600 each having the avalanche photodiode 104, the overflow transistor 105 that discharges signal charges generated by the avalanche photodiode 104 to the reset drain, and the transfer gate transistor 102 that transfers the signal charges generated by the avalanche photodiode 104 to the floating diffusion FD. The solid-state imaging device 1 also includes the first driver circuit 14a that controls the transfer gate transistors 102, the second driver circuit 14b that controls the overflow transistors 105, the first auxiliary driver circuit 18a that controls the third and fourth switch transistors 307 and 308 in the first driver circuit 14a, and the second auxiliary driver circuit 18b that controls the third and fourth switch transistors 307 and 308 in the second driver circuit 14b. When the first voltage is supplied to the gates of the transfer gate transistors 102 and the overflow transistors 105 in the pixels 600, these transistors are not connected with the first power supply 221, but connected with the first capacitor 305. When the second voltage is supplied to the gates of the transfer gate transistors 102 and the overflow transistors 105, these transistors are not connected with the second power supply 222, but connected with the second capacitor 306. Also, when the third voltage is supplied to the gates of the third and fourth switch transistors 307 and 308, these transistors are not connected with the third power supply 223, but connected with the third capacitors 405a and 405b, respectively. When the fourth voltage is supplied to the gates of the third and fourth switch transistors 307 and 308, these transistors are not connected with the fourth power supply 224, but connected with the fourth capacitors 406a and 406b, respectively. That is, the wiring lengths from the supply sources of the first and second voltages to the transfer gate transistors 102 and to the overflow transistors 105 are shortened, permitting high-speed drive of the transfer gate transistors 102 and the overflow transistors 105. Also, having no influence of parasitic components related to wiring other than the wiring from the first and second capacitors 305 and 306 to the transfer gate transistors 102 and the wiring from the first and second capacitors 305 and 306 to the overflow transistors 105, it is possible to minimize a lag in the drive timing of a plurality of pixels 600. Moreover, the wiring lengths from the supply sources of the third and fourth voltages to the third switch transistors 307 and to the fourth switch transistors 308 are shortened, permitting high-speed drive of the third and fourth switch transistors 307 and 308. Also, having no influence of parasitic components related to wiring other than the wiring from the third and fourth capacitors 405a and 406a to the third switch transistors 307 and the wiring from the third and fourth capacitors 405b and 406b to the fourth switch transistors 308, it is possible to minimize a lag in the drive timing of the third and fourth switch transistors 307 and 308. This makes it possible to speed up the driving of the pixels 600 while minimizing a lag in the drive timing of the pixels 600.

The second signal lines 202 are formed to be smaller in wiring width than the first and third signal lines 201 and 203. This prevents the area of the layout of the pixels 600 from being narrowed.

When the light source 4 is a laser, it emits pulsed light having extremely large peak power (e.g., 100 W or more) and a small width (on the order of several tens of ns). That is, since the light source 4 emits pulsed light during a very short period (during time t44 to t45), the first to fourth capacitors 305, 306, 405a, 405b, 406a, and 406b can be charged during a period (during time t41 to t42) other than the emission period. Therefore, since the emission of the light source 4 and the charging of the first to fourth capacitors 305, 306, 405a, 405b, 406a, and 406b can be set at different timings from each other, power reduction at the emission of the light source 4 can be prevented.

Also, the emission time of the light source 4 is shorter than the charge time of the first to fourth capacitors 305, 306, 405a, 405b, 406a, and 406b; e.g., the ratio of the former to the latter is set at 1:100. Therefore, with the charge time of the capacitors being long, power reduction of the light source 4 due to a temperature rise of the light source 4 can be prevented.

At time t52, the column circuits 15 may set the voltage supplied through the vertical signal lines 121 to a reset level voltage. Based on the reset level voltage, the column circuits 15 may sample the signal charges output from the pixels 600.

While the solid-state imaging device and the distance measuring device perform the operation in the readout period after performing the operation in the exposure period a plurality of times in the above embodiments, the operation is not limited to this. The operation in the readout period may be performed after the operation in the exposure period performed only once.

According to the present disclosure, it is possible to speed up the driving of pixels while minimizing a lag in the drive timing of the pixels. The present disclosure is therefore applicable to range cameras, for example.

What is claimed is:
1. A solid-state imaging device, comprising:
a plurality of pixels arranged in a matrix;
a plurality of first signal lines each connected in common to pixels arranged in a row, among the plurality of pixels; and
a driver circuit that supplies voltages to the first signal lines for exposing the plurality of pixels,
wherein
each of the pixels outputs a signal when receiving a first voltage through the first signal line and does not output a signal when receiving a second voltage through the first signal line,
the driver circuit includes
a first node connected to at least one of the plurality of first signal lines, and
a driver circuit unit that outputs a voltage to the first node, and
the driver circuit unit includes
a first capacitor that receives the first voltage and supplies the first voltage to the first node,
a second capacitor that receives the second voltage and supplies the second voltage to the first node,
a first switch transistor provided between the first voltage and the first capacitor,
a second switch transistor provided between the second voltage and the second capacitor,
a third switch transistor provided between the first capacitor and the first node, and
a fourth switch transistor provided between the second capacitor and the first node.

2. The solid-state imaging device of claim 1, wherein
the first voltage is higher than the second voltage,
the third switch transistor is a p-type MOS transistor having a source connected to the first capacitor and a drain connected to the first node, and turned on or off with a voltage received at its gate, and
the fourth switch transistor is an n-type MOS transistor having a source connected to the second capacitor and a drain connected to the first node, and turned on or off with a voltage received at its gate.

3. The solid-state imaging device of claim 1, wherein the capacitance of the second capacitor is greater than the capacitance of the first capacitor.

4. The solid-state imaging device of claim 1, further comprising:
a gate line connected to gates of the first and second switch transistors, wherein
the first switch transistor is turned on or off with a voltage input into its gate through the gate line, and
the second switch transistor is turned on or off with a voltage input into its gate through the gate line.

5. The solid-state imaging device of claim 1, wherein the driver circuit includes the first node and the driver circuit unit for each of the plurality of first signal lines.

6. The solid-state imaging device of claim 5, further comprising:
a multiplexer including a plurality of second nodes for outputting the first voltage and the second voltage from the plurality of second nodes so as to expose the plurality of pixels sequentially row by row; and
a plurality of switches provided for the plurality of first signal lines each for changing the connection of the first signal line to either the first node or the second node.

7. The solid-state imaging device of claim 1, further comprising:
an auxiliary driver circuit that controls the third switch transistor and the fourth switch transistor in the driver circuit,
wherein
the auxiliary driver circuit includes
a third node connected to a gate of the third switch transistor or the fourth switch transistor,
a third capacitor that receives a third voltage and supplies the third voltage to the third node,
a fourth capacitor that receives a fourth voltage and supplies the fourth voltage to the third node,
a fifth switch transistor provided between the third voltage and the third capacitor,
a sixth switch transistor provided between the fourth voltage and the fourth capacitor,
a seventh switch transistor provided between the third capacitor and the third node, and
an eighth switch transistor provided between the fourth capacitor and the third node.

8. The solid-state imaging device of claim 7, wherein
the third node is connected to the gate of the third switch transistor, and
the third switch transistor is turned on when the fourth voltage is supplied to its gate from the third node and turned off when the third voltage is supplied to its gate from the third node.

9. The solid-state imaging device of claim 7, wherein
the third node is connected to the gate of the fourth switch transistor, and
the fourth switch transistor is turned on when the third voltage is supplied to its gate from the third node and turned off when the fourth voltage is supplied to its gate from the third node.

10. The solid-state imaging device of claim 1, wherein
each of the pixels includes
a photoelectric conversion unit, and
a transfer gate transistor,
the photoelectric conversion unit converts incident light to signal charges, and
the transfer gate transistor has a gate connected to the first signal line and, when the first voltage is supplied to the gate, transfers the signal charges generated by the photoelectric conversion unit to floating diffusion.

11. The solid-state imaging device of claim 10, wherein
each of the pixels further includes an overflow transistor, and
the overflow transistor has a gate connected to the first signal line and, when the first voltage is supplied to the gate, discharges the signal charges generated by the photoelectric conversion unit.

12. The solid-state imaging device of claim 10, wherein the photoelectric conversion unit is an avalanche photodiode.

13. The solid-state imaging device of claim 10, further comprising:
a second signal line;
a multiplexer; and
a vertical shift register that transfers signal charges output from the pixels in a column direction,
wherein
each of the pixels further includes a selection transistor having a gate connected to the second signal line and, when receiving an output signal at the gate, outputs the signal charges from the floating diffusion to the vertical shift register,
the multiplexer is connected to the second signal line, and outputs the output signal to the selection transistor through the second signal line, and
the first signal line is greater in wiring width than the second signal line.

14. A distance measuring device comprising:
the solid-state imaging device of claim 1; and
a light source,
wherein
the emission time of the light source is shorter than the time during which the first and second switch transistors are on.

15. A distance measuring device comprising:
the solid-state imaging device of claim 1; and
a light source,
wherein
the first and second switch transistors are off during emission of the light source and during exposure of the pixels by the driver circuit.

16. A distance measuring method using the solid-state imaging device of claim 1 and a light source, comprising the steps of:
(1) turning on the first switch transistor to charge the first capacitor up to the first voltage and also turning on the second switch transistor to charge the second capacitor up to the second voltage;
(2) turning off the first switch transistor to terminate the charging of the first capacitor and also turning off the second switch transistor to terminate the charging of the second capacitor;
(3) letting the light source emit light;

(4) turning on the third switch transistor to supply the first voltage from the first capacitor to the pixels through the first signal line; and
(5) turning off the third switch transistor and also turning on the fourth switch transistor to supply the second voltage from the second capacitor to the pixels through the first signal line.

\* \* \* \* \*